(12) United States Patent
How et al.

(10) Patent No.: US 6,660,055 B2
(45) Date of Patent: Dec. 9, 2003

(54) COMPARTMENT FOR MAINTAINING A CLEAN PRODUCTION ENVIRONMENT

(75) Inventors: Wee Kiun How, Singapore (SG); Jian Zhang, Singapore (SG); Lian Hok Tan, Singapore (SG)

(73) Assignee: ASM Technology Singapore PTE Ltd., Singapore (SG)

( * ) Notice: Subject to any disclaimer, the term of this patent is extended or adjusted under 35 U.S.C. 154(b) by 116 days.

(21) Appl. No.: 10/029,096

(22) Filed: Oct. 25, 2001

(65) Prior Publication Data

US 2003/0079448 A1 May 1, 2003

(51) Int. Cl.[7] ................................................. B01L 1/04
(52) U.S. Cl. ............... 55/385.2; 55/385.6; 55/DIG. 18; 55/DIG. 46; 361/681; 361/682; 454/187; 454/192
(58) Field of Search ............................. 55/385.2, 385.6, 55/DIG. 46, DIG. 18; 454/187, 192; 361/681, 682

(56) References Cited

U.S. PATENT DOCUMENTS

| 4,934,920 | A |   | 6/1990  | Yamauchi et al. |         |
|-----------|---|---|---------|-----------------|---------|
| 5,223,006 | A | * | 6/1993  | Moran, III      | 55/385.6 |
| 5,277,654 | A | * | 1/1994  | Fenn et al.     | 454/187  |
| 5,424,806 | A | * | 6/1995  | Siegel          | 55/385.6 |
| 5,843,196 | A | * | 12/1998 | Leavey et al.   | 55/385.2 |
| 6,120,371 | A | * | 9/2000  | Roberson, Jr. et al. | 454/187 |
| 6,238,283 | B1 | * | 5/2001 | Matsuyama et al. | 454/187 |
| 6,353,532 | B1 | * | 3/2002 | Landrum et al.   | 361/681  |
| 6,364,762 | B1 | * | 4/2002 | Kaveh et al.     | 454/187  |
| 6,483,695 | B1 | * | 11/2002 | Hartstein       | 361/681  |

* cited by examiner

Primary Examiner—Duane Smith
Assistant Examiner—Minh-Chau T. Pham
(74) Attorney, Agent, or Firm—Ostrolenk, Faber, Gerb & Soffen, LLP

(57) ABSTRACT

The invention relates to a compartment 10 having a space 32 segregated from air outside the compartment and capable of housing a product apparatus for assembly of, for example, semiconductor devices and integrated circuit packages in a "clean" environment. The compartment 10 includes panels 16 to segregate the air inside the compartment 10 from the surrounding environment. At the front of the compartment 10, there is a top access panel 12 and a bottom access panel 14 to access a production apparatus (not shown) which is houseable or storable within a space 32 for such apparatus defined within the compartment 10. Where it is desired to place a plurality of similar compartments 10 adjacent to one another to provide a production line, an opening 18 can be included in one or both of the side panels 16 for transfer of processed material, such as leadframes for assembling integrated circuit packages, from one production apparatus to another, housed in respective adjacent compartments 10. Thus the or each compartment 10 provides an individual clean space for carrying out a particular step of a production process. It is not therefore necessary to provide a single, massive, clean room.

20 Claims, 3 Drawing Sheets

COMPARTMENT FOR MAINTAINING A CLEAN PRODUCTION ENVIRONMENT

FIELD OF THE INVENTION

The invention relates to a compartment for carrying out processes which require an environment with a relatively high degree of cleanliness, such as processes for assembling semiconductor devices and integrated circuit packages.

BACKGROUND AND PRIOR ART

Traditionally, large clean rooms with cleanliness levels of below 10,000 or 100,000 particles 0.5 microns or larger per cubic meter of air (hereinafter referred to as class 10,000 and 100,000 respectively) is required to provide the clean air needed for the assembly, packaging and testing of integrated circuit packages. Electrical risers are commonly installed in the clean room to supply the necessary electrical and gas supplies to the semiconductor producing equipment.

Such clean rooms are very expensive to set up and to maintain. Due to increased automation of manufacturing and assembly processes, it would be advantageous to reduce the size of the environment wherein the clean air is maintained so as to minimize the set-up and maintenance costs required for a traditional clean room.

In U.S. Pat. No. 4,934,920 relating to "An Apparatus for Producing Semiconductor Device", an apparatus is described to provide a more dust-free environment for the production of semiconductor devices. The apparatus comprises a dust-proof cover which shields the semiconductor chips and the lead frame from ambient air and a dust collecting means for sticking air out of the dust-proof cover to suck dust from the interior of the dust-proof cover. Whilst it serves to remove dust generated by the discharge of dust from the molding process, it does not solve ale problem of performing the whole manufacturing process, which may include a whole production line involved in the semiconductor assembly process, in an environment that is cleaner than its surroundings.

SUMMARY OF THE INVENTION

It is an object of the invention to seek the mitigate the disadvantages of the prior art.

Accordingly, the invention provides a compartment having a space segregated from air outside the compartment and is capable of storing a production apparatus, comprising panels defining the space, an air transmission passage channeling air into the space, air filtering means disposed between the air transmission passage and the space to cleanse air entering from the air transmission passage, and an air outlet to allow air to be expelled from the space, whereby the compartment is adapted continuously to maintain air within the compartment cleaner than the air outside the compartment.

Using the invention, it is possible to provide a compartment wherein one or more production apparatuses in which a manufacturing process is carried out may be segregated from the surrounding environment. Means may provided to maintain the space within the or each compartment at a level of cleanliness that is higher than the surrounding environment so as to obviate the need for a traditional large clean room to carry out the manufacturing processes.

It will be convenient to hereinafter describe the invention in greater detail by reference to the accompanying drawings which illustrate one embodiment of the invention. The particularity of the drawings and the related description is not to be understood as superseding the generality of the broad. Identification of the invention as defined by the claims.

BRIEF DESCRIPTION OF THE DRAWINGS

The drawings represent a preferred embodiment of the invention by way of illustration only wherein.

DETAILED DESCRIPTION OF PREFERRED EMBODIMENT OF THE INVENTION

Figure 1:
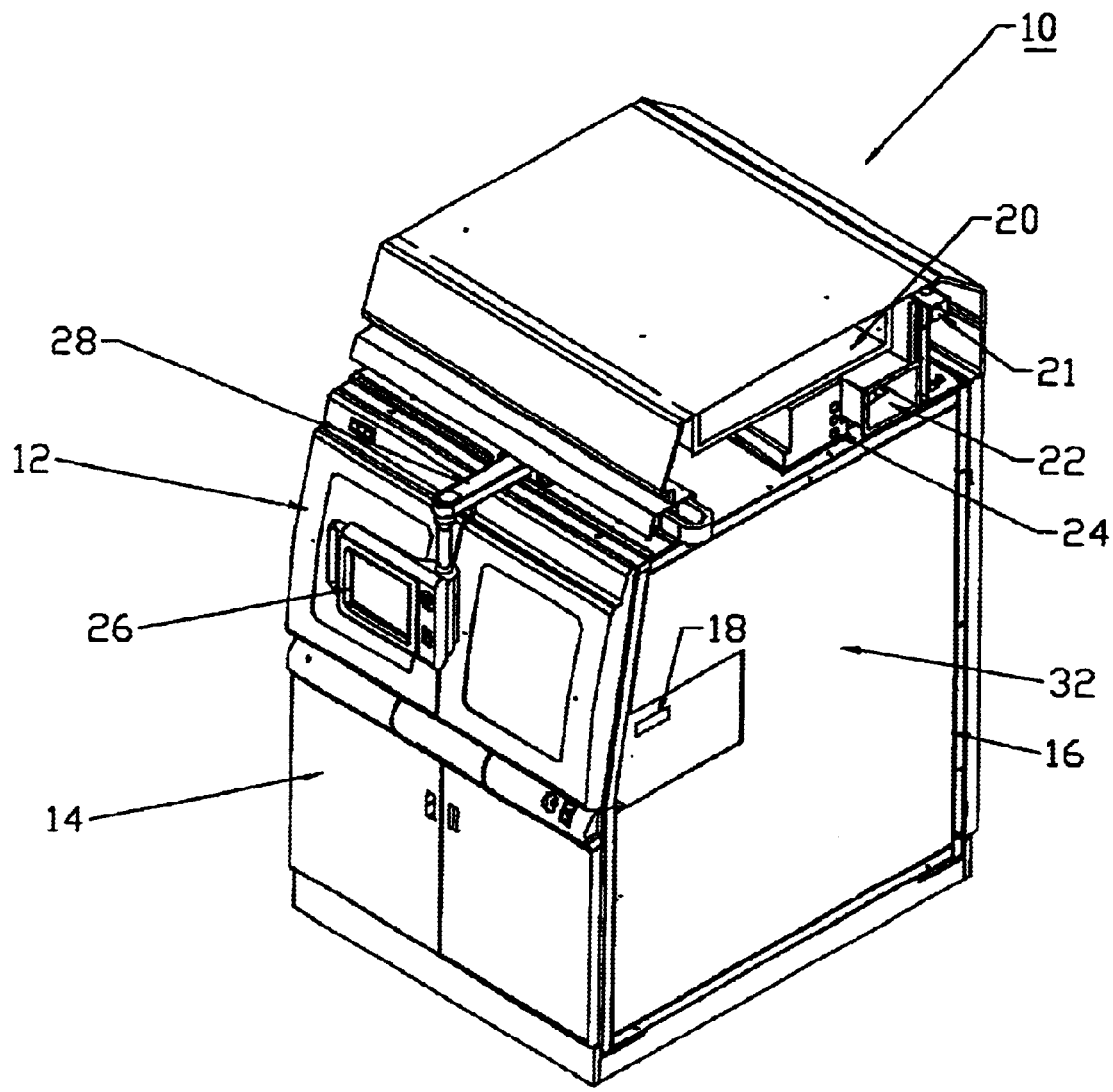
FIG. 1 is an isometric view of a compartment according to the preferred embodiment of the invention.
Figure 2:
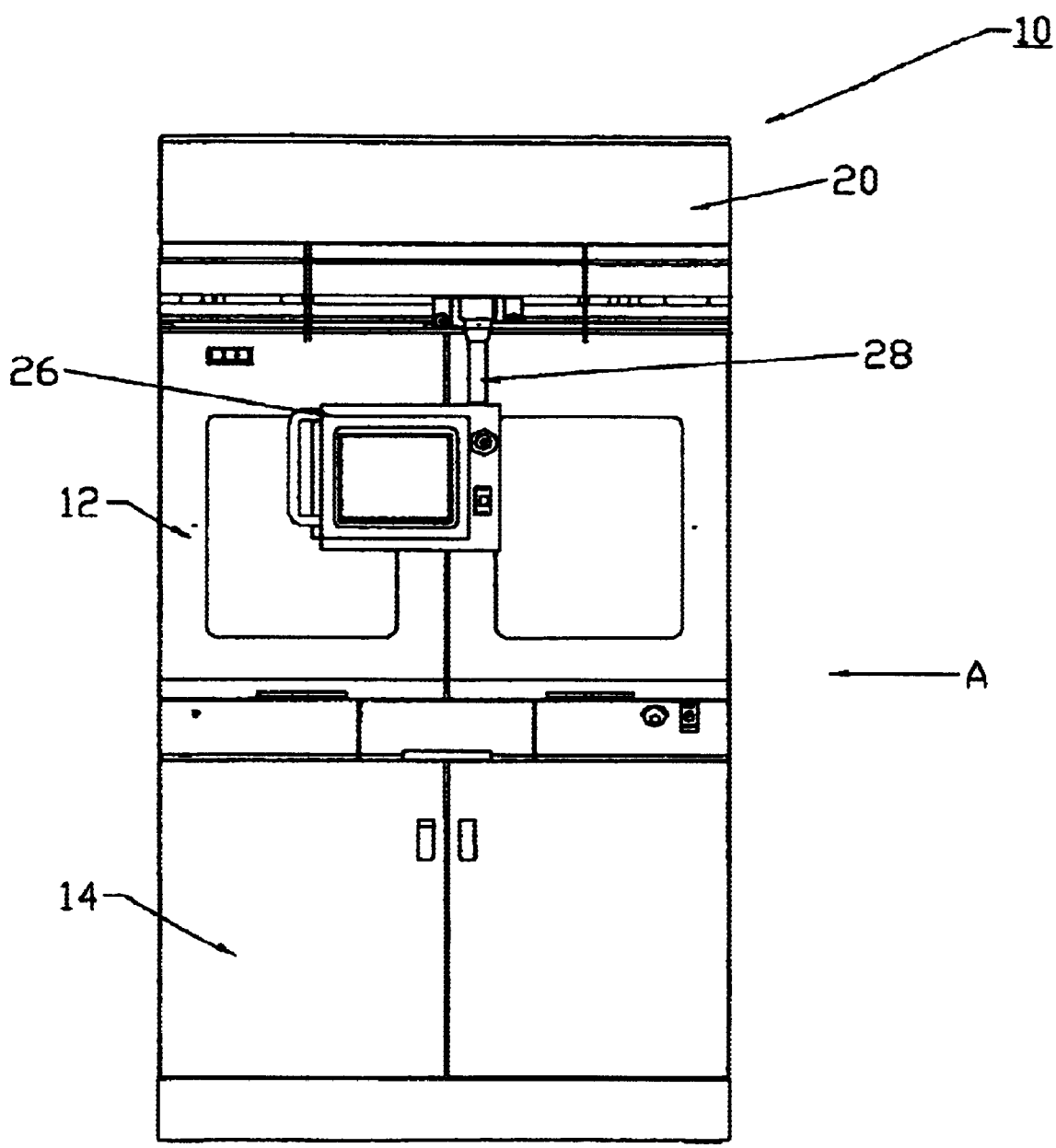
FIG. 2 is a front elevation view of the compartment of FIG. 1.

FIG. 1 is an isometric view of a compartment 10 according to the preferred embodiment of the invention. FIG. 2 is a front elevation view of the compartment of FIG. 1. The compartment 10 includes panels 16 to segregate the air inside the compartment 10 from the surrounding environment. At the front of the compartment 10, there is a top access panel 12 and a bottom access panel 14 to access a production apparatus (not shown) which is houseable or storable within a space 32 for such apparatus within the compartment 10.

Where it is desired to place a plurality of compartments 10 adjacent to one another to accommodate a production line, an opening 18 can be included on one or both of the side panels 16 for transfer of processed material, such as lend frames for assembling integrated circuit packages, from one production apparatus to another, housed in respective adjacent compartments 10.

At the top (as viewed) of the compartment 10, there is an air transmission passage, which may be in the form of a ventilation duct 20, to introduce air from an air-generating means, such as an air conditioner, into the space 32 in the compartment 10. Alternatively, a blower 29 may directly draw air from the surrounding environment. It is this preferred, but not necessary, that the air introduced by the air-generating means is substantially dean. The compartment 10 includes a blower 29 and air filter 30 (see FIG. 3) to purify air entering the space 32 from the ventilation duct 20. The air filter is preferably a HEPA filter of a grade of class 1,000 or less.

Whilst clean air is introduced into the compartment 10, it is necessary for air within the space 32 to be expelled from the compartment 10, due to contamination from the manufacturing process and other factors. Thus, an air outlet, such as a ventilation outlet 22, for air to enter it through a return path 23, is implemented to allow air within the space 32 to escape while at the same time, more air is being fed into the space 32 via the ventilation duct 20.

Additionally, various trunkings can be included to allow cabling links to the production apparatus within each compartment 11. For example, an electrical trunking 21 may be included to run electrical cables along the top of the compartment and into the production apparatus in the compartment 10. There may also be various gas ducts 24 to channel gases generally used in a semiconductor manufacturing process into the production apparatus, such as compressed air or nitrogen.

Optionally, display means such as a liquid crystal display (LCD) monitor 26 may be included to the compartment 10 and mounted unto a mounting arm 28. The display means 26 may be used to display production parameters production progress and/or other information to monitor the production process. The mounting arm 28 preferably includes at its distal end a roller 32 and a guide rail 34 (see FIG. 3) so that the display means 26 is movable to various positions along a production line of similar compartments.

Figure 3:
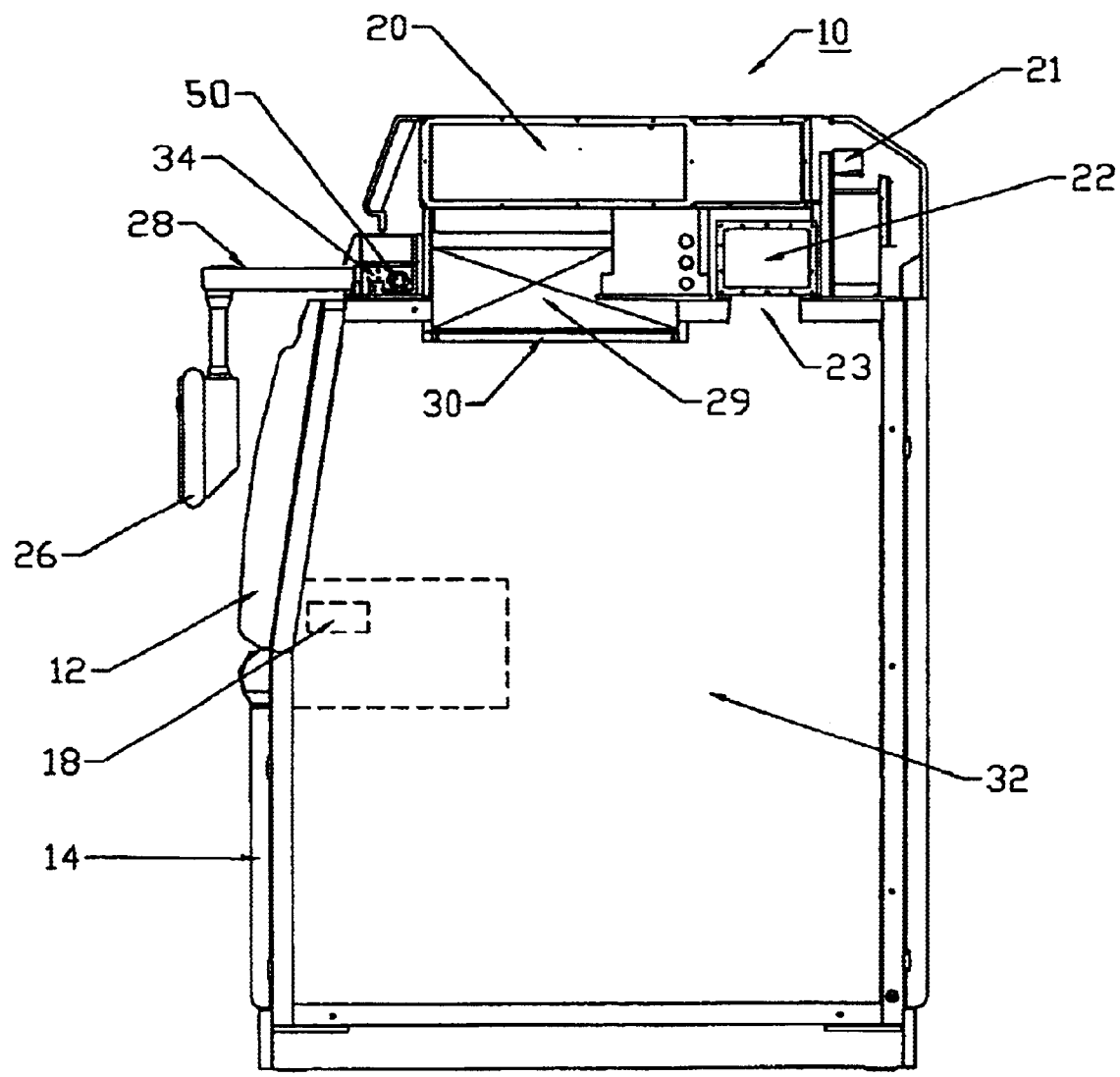
FIG. 3 is a side elevation view of the compartment looking from direction A of FIG. 2.

FIG. 3 is a side elevation view of the compartment looking from direction A of FIG. 2 in particular, sectional views of the ventilation duct 20, ventilation outlet 22 and cable trunking 21 are shown.

It will be understood that air from the ventilation duct 20 is drawn into the space 32 within the compartment 10 by means of a blower 29. Located between the blower 29 and the space 32 is an air filter 30 that filters air that is blown into the space 32. The air filter 30 seeks to maintain the cleanliness of the air inside the space 32 to preferably class 1,000 or better, i.e. less than 1,000 particles 0.5 microns or larger per cubic meter of air. The air in the space 32 leaves the space 32 into the ventilation output 22 through a return path 23 that is formed between the ventilation outlet 22 and the space 32. Due to the pressure formed in the space 32 by the blower 20 forcing air into the space 32, the air would tend to escape through the return path 23 into the ventilation outlet 22 owing to a pressure differential between the ventilation duct 20 and the ventilation outlet 22. Nevertheless, to increase the air-flow pressure differential, it is possible to include a suction fan (not shown) at a point along the ventilation outlet 22 to force air out of the space 32, via the ventilation outlet 92. The suction fan may be in the ventilation outlet 22 or at its entry or exit.

As regards the display means 26 mounted on the mounting arm 28, there is a roller 50 mounted on the distal end of the mounting arm 28, which is guided along the side of the compartment 10 by a guide rail 34. This function is most useful when a plurality of compartments are arranged side-by-side to form a production line. When the guide rail 34 of each adjacent compartment is aligned and intersected with that of an adjacent one., the mounting arm 28 and display means 26 may be slid from one compartment to another by an operator, depending on the location of the operator, along the production line. A communications cable linking the display means 26 to a computer processing information for display is provided to extend along the plurality of compartments covered by the display means 26.

When a number of similar compartments 10 are aligned side-by-side to form a production line, and suitably interconnected, the openings 18 should also be aligned such that processed material may be passed from a production apparatus within one compartment to a production apparatus in an adjacent compartment. A typical production line for integrated circuit packages would include one or more die-bonders, snap-cures ovens, buffers, strip-based plasma systems, wire-bonders, molding machines, trim and form machines, and strip testers.

Each component in the production line may preferably be housed in a separate compartment 10 to maintain the clean processing environment within each space 32. A compartment 10 has interengagement moons whereby it may be connected with a similar compartment in a manner to provide that each space 32 is segregated from outside (ambient) air, and to that end the ventilation ducts 10 and outlets 22 of adjacent interconnected compartments 10 may be releasably engageable as by a push-fit connection. Conveying means (not shown) such as rollers for transporting leak frames may be included to automate the transfer of processed material from one apparatus to another, the processed material passing through tip openings 18. The separation of production of each manufacturing component into a separate compartment 10 has the advantage of modularity, so that different components in the production line may be mixed and matched according to manufacturing requirements with minimal re-orientation of production equipment or machines. A modular production line is thereby provided.

The panels 12, 14, 16 of the compartment 10 may be made of fiberglass; or other suitable material. The material may be opaque with a selected transparent viewing area, or wholly transparent, in which event the processes being carried out can be more easily monitored.

It would be appreciated that the invention provides the incorporation of embedded facilities in the form of a compartment with a controlled environment for one or more equipment in the production line. By enclosing the equipment with a compartment that is self contained with clean dry air, electrical, gas and communication network supplies, the cleanliness level required of the rest of the room wherein the equipment is held can be reduced.

The invention described herein is susceptible to variations, modifications and/or additions other than those specifically described and it is to be understood that the invention includes all such variations, modifications and/or additions which fall within the spirit and scope of the above description.

What is claimed is:

1. A compartment to house at least one production apparatus for performing at least one production task on a workpiece, the compartment comprising:
    panels defining a space segregated from an environment external to the compartment;
    an air transmission passage configured to channel air into the space;
    an air filtering arrangement disposed between the air transmission passage and the space to cleanse the air channeled from the air transmission passage so that the air within the compartment is continuously maintained cleaner than air outside the compartment;
    an air outlet arrangement to permit the air to be expelled from the space; and
    a transport arrangement configured to permit the compartment to be detachably coupled directly to at least one adjacent second compartment to form a production line for the workpiece.

2. The compartment of claim 1, wherein the space of the compartment is sized to accommodate the production apparatus.

3. The compartment of claim 1, wherein the transport arrangement includes a conveying arrangement configured to convey the workpiece from the space to the adjacent second compartment.

4. The compartment of claim 1, wherein the panels include at least one opening aligned with a respective second opening of the adjacent second compartment to convey the workpiece from the space to the adjacent second compartment.

5. The compartment of claim 1, further comprising:
    an access arrangement configured to permit access to the production apparatus to permit the production apparatus to be interchanged with at least one second production apparatus without reorienting the compartment within the production line.

6. The compartment of claim 5, wherein the access arrangement includes an access panel.

7. The compartment of claim 1, further comprising:

a display arrangement to permit an operator to monitor at least one of production parameters, production process and production process information.

8. The compartment of claim 7, further comprising:

a mounting arrangement slideably coupled to one of the panels along a width of the compartment, the display arrangement being mounted to the mounting arrangement.

9. The compartment of claim 8, wherein the mounting arrangement is operable to be slid to the adjacent second compartment to permit the display arrangement to be slid over an entire width of the production line.

10. The compartment of claim 1, further comprising:

an electrical trunking arrangement to supply electricity to the production apparatus within the compartment.

11. The compartment of claim 1, further comprising:

at least one gas duct to supply an associated gas to the production apparatus within the compartment.

12. The compartment of claim 1, wherein the filter arrangement maintains a cleanliness of the air within the space at least at class 1,000.

13. A production line for performing a plurality of production tasks on a workpiece, the production line comprising:

a plurality of adjacent compartments detachably coupled to one another, each of the compartments housing at least one production apparatus to perform at least one of the production tasks on the workpiece, each of the compartments including:

panels defining a space segregated from an environment external to the compartment;

an air transmission passage configured to channel air into the space;

an air filtering arrangement disposed between the air transmission passage and the space to cleanse the air channeled from the air transmission passage so that the air within the compartment is continuously maintained cleaner than air outside the compartment;

an air outlet arrangement to permit the air to be expelled from the space; and a transport arrangement configured to permit the compartments to be detachably coupled directly to one another to form the production line.

14. The production line of claim 13, wherein the transport arrangement of each of the compartments includes a conveying arrangement configured to convey the workpiece from the space to an adjacent compartment.

15. The production line of claim 13, wherein the panels of the compartments respectively include at least one opening mutually aligned to convey the workpiece between the compartments in the production line.

16. The production line of claim 13, wherein each of the compartments further includes an access arrangement configured to permit access to the production apparatus to permit the production apparatus to be interchanged with at least one second production apparatus without reorienting the compartments within the production line.

17. The production line of claim 1, wherein each of the compartments further includes a display arrangement to permit an operator to monitor at least one of production parameters, production process and production process information.

18. The production line of claim 17, wherein each of the compartments further includes a mounting arrangement slideably coupled to one of the panels along a width of the compartment, the display arrangement being mounted to the mounting arrangement.

19. The production line of claim 18, wherein the mounting arrangement is operable to be slid between the compartments to permit the display arrangement to be slid over an entire width of the production line.

20. The production line of claim 13, wherein the production apparatus includes at least one of a die-bonder, a snap-cure oven, a butter, a strip-based plasma system, a wire-bonder, a molding machine, a trim and form machine, and a strip tester.

* * * * *